United States Patent
Morimoto

(10) Patent No.: US 10,252,418 B2
(45) Date of Patent: Apr. 9, 2019

(54) LOAD PARAMETER SETTING METHOD AND LOAD PARAMETER SETTING DEVICE

(71) Applicant: FANUC CORPORATION, Minamitsuru-gun, Yamanashi (JP)

(72) Inventor: Kenjirou Morimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/145,952

(22) Filed: May 4, 2016

(65) Prior Publication Data
US 2016/0327934 A1    Nov. 10, 2016

(30) Foreign Application Priority Data
May 8, 2015    (JP) .................................. 2015-095560

(51) Int. Cl.
| | | |
|---|---|---|
| G05B 19/00 | (2006.01) | |
| B25J 9/16 | (2006.01) | |
| B23K 26/08 | (2014.01) | |
| H02P 21/22 | (2016.01) | |

(52) U.S. Cl.
CPC ... B25J 9/1653 (2013.01); G05B 2219/39107 (2013.01)

(58) Field of Classification Search
CPC ..... B25J 9/1671; B23K 26/0884; H02P 21/22
USPC ................................. 700/245, 260
See application file for complete search history.

(56) References Cited

U.S. PATENT DOCUMENTS

| | | | | |
|---|---|---|---|---|
| 2002/0143435 A1* | 10/2002 | Terada | ............... | B23K 26/0884 700/245 |
| 2005/0032471 A1* | 2/2005 | Pfarr | .................. | B23K 26/0838 452/181 |
| 2005/0049749 A1* | 3/2005 | Watanabe | .............. | B25J 9/1671 700/245 |
| 2006/0006825 A1* | 1/2006 | Inaguma | ................. | H02P 21/22 318/432 |
| 2008/0082213 A1* | 4/2008 | Ban | ........................ | B25J 9/1697 700/260 |
| 2009/0105880 A1 | 4/2009 | Okazaki | | |

(Continued)

FOREIGN PATENT DOCUMENTS

| | | |
|---|---|---|
| JP | 2004025387 A | 1/2004 |
| JP | 2004276125 A | 10/2004 |
| JP | 2008049459 A | 3/2008 |

(Continued)

OTHER PUBLICATIONS

Decision to Grant for Japanese Application No. 2015-095560, dated May 30, 2017, including English translation, 6 pages.

Primary Examiner — Jorge L Carrasquillo
Assistant Examiner — Cortez M Cook
(74) Attorney, Agent, or Firm — RatnerPrestia

(57) ABSTRACT

A load parameter setting device includes: a storage unit that stores a plurality of load parameters corresponding to a plurality of types of workpieces to be gripped by the robot respectively; an index calculation unit that calculates, for each of the plurality of stored load parameters, an index for selection of the load parameter of the workpiece gripped by the robot based on a current position and orientation of the robot; and a selection unit that selects the load parameter of the workpiece from among the plurality of load parameters stored in the storage unit based on the calculated index.

8 Claims, 5 Drawing Sheets

(56) References Cited

U.S. PATENT DOCUMENTS

2009/0133947 A1* 5/2009 Yoshihara ................ B60K 6/48
 180/65.285
2013/0238196 A1* 9/2013 Seto ..................... B62D 5/0472
 701/42

FOREIGN PATENT DOCUMENTS

| JP | 2010264559 A | 11/2010 |
| JP | 2011-235374 A | 11/2011 |
| JP | 2013-056402 A | 3/2013 |
| WO | 2007080733 A1 | 7/2007 |

* cited by examiner

FIG. 2

|  | | LOAD PARAMETER | | | | |
|---|---|---|---|---|---|---|
|  |  | W | B | I | S | ... |
| WORKPIECE | C1 | W1 | B1 | I1 | S1 | ... |
|  | C2 | W2 | B2 | I2 | S2 | ... |
|  | C3 | W3 | B3 | I3 | S3 | ... |
|  | ⋮ | ⋮ | ⋮ | ⋮ | ⋮ | ... |
|  | Cn | Wn | Bn | In | Sn | ... |

FIG. 4

```
ROBOT OPERATION PROGRAM 1 :

OPERATION INSTRUCTION TO POSITION 1 ;
OPERATION INSTRUCTION TO POSITION 2 ;
INSTRUCTION TO CLOSE ROBOT HAND ;
AUTOMATIC LOAD PARAMETER SELECTION INSTRUCTION ;
OPERATION INSTRUCTION TO POSITION 1 ;
OPERATION INSTRUCTION TO POSITION 3 ;
OPERATION INSTRUCTION TO POSITION 4 ;
INTRUCTION TO OPEN ROBOT HAND ;
AUTOMATIC LOAD PARAMETER SELECTION INSTRUCTION ;
```

```
ROBOT OPERATION PROGRAM 2 :

OPERATION INSTRUCTION TO POSITION 1 ;
OPERATION INSTRUCTION TO POSITION 2 ;
INSTRUCTION TO CLOSE ROBOT HAND ;
OPERATION INSTRUCTION TO POSITION 1 ;
OPERATION INSTRUCTION TO POSITION 3 ;
OPERATION INSTRUCTION TO POSITION 4 ;
INSTRUCTION TO OPEN ROBOT HAND ;
OPERATION INSTRUCTION TO POSITION 3 ;
```

21b

LOAD PARAMETER SETTING METHOD AND LOAD PARAMETER SETTING DEVICE

BACKGROUND OF THE INVENTION

1. Field of the Invention

The present invention relates to a load parameter setting method and a load parameter setting device for setting load parameters of a workpiece gripped by a robot.

2. Description of the Related Art

When it is necessary for the robot to sequentially grasp a plurality of workpieces, the operator sets beforehand the load parameter for each workpiece, e.g., the mass, position of gravity center, inertia, size or the like of the workpiece. During operation of the robot, the load parameter is changed arbitrarily, and the condition of the robot is detected, depending on the workpiece gripped by the robot.

Further, the load parameter may be determined during operation of the robot. In Japanese Laid-open Patent Publication No. 2011-235374 and Japanese Laid-open Patent Publication No. 2013-56402, it is disclosed to determine the load parameter as the weight of the workpiece.

SUMMARY OF THE INVENTION

However, there is a case in which an operator may forget to switch the load parameter of the gripped workpiece or erroneously set the load parameter. In such a case, it is not possible to perform appropriate control depending on the load parameter. Further, in Japanese Laid-open Patent Publication No. 2011-235374 and Japanese Laid-open Patent Publication No. 2013-56402, there is a problem in which it is necessary to perform a complex calculation in order to determine the load parameter and thus time is taken so that processing is delayed.

The present invention has been made in view of the above circumstances, and has for an object to provide a load parameter setting method and a load parameter setting device capable of automatically setting a load parameter for a workpiece gripped by a robot without performing a complex calculation.

In order to achieve the above object, according to a first aspect of the present invention, there is provided a load parameter setting device for setting a load parameter of a workpiece gripped by a robot including a plurality of motors that drive a plurality of motion axes respectively, the load parameter setting device including: a storage unit that stores a plurality of load parameters corresponding to a plurality of types of workpieces to be gripped by the robot respectively; an index calculation unit that calculates, for each of the plurality of load parameters stored in the storage unit, an index for selection of the load parameter of the workpiece gripped by the robot based on a current position and orientation of the robot; and a selection unit that selects the load parameter of the workpiece from among the plurality of load parameters stored in the storage unit based on the index calculated by the index calculation unit.

According to a second aspect of the present invention, the load parameter setting device according to the first aspect further includes an operation area designation unit that designates an operation area of the robot for selecting the load parameter.

According to a third aspect of the present invention, in the load parameter setting device according to the first or second aspect, an operation program of the robot includes an instruction for selecting the load parameter.

According to a fourth aspect of the present invention, in the load parameter setting device according to any of the first to third aspects, the index calculation unit includes: a theoretical torque calculation unit that calculates, for each of the plurality of load parameters, a plurality of theoretical torques outputted by one motor of the plurality of motors based on a current position and orientation of the robot; and an actual torque calculation unit that calculates an actual torque of the one motor based on current feedback information of the one motor, wherein the selection unit selects a load parameter corresponding to a theoretical torque closest to the actual torque among the plurality of theoretical torques.

According to a fifth aspect of the present invention, in the load parameter setting device according to the fourth aspect, the theoretical torque calculation unit has a plurality of calculation methods for calculating the theoretical torques, and includes a calculation method setting unit that sets one calculation method of the plurality of calculation methods.

According to a sixth aspect of the present invention, there is provided a load parameter setting method for setting a load parameter of a workpiece gripped by a robot including a plurality of motors that drive a plurality of motion axes respectively, the load parameter setting method including steps of: storing a plurality of load parameters corresponding to a plurality of types of workpieces to be gripped by the robot respectively; calculating, for each of the plurality of stored load parameters, an index for selecting the load parameter of the workpiece gripped by the robot based on a current position and orientation of the robot; and selecting the load parameter of the workpiece from among the plurality of stored load parameters based on the calculated index.

According to a seventh aspect of the present invention, the load parameter setting method according to the sixth aspect further includes a step of designating an operation area of the robot for selecting the load parameter.

According to an eighth aspect of the present invention, in the load parameter setting method according to the sixth or seventh aspect, an operation program of the robot includes an instruction for selecting the load parameter.

According to a ninth aspect of the present invention, in the load parameter setting method according to any of the sixth to eighth aspects, the step of calculating the index includes: calculating, for each of the plurality of load parameters, a plurality of theoretical torques outputted by one motor of the plurality of motors based on a current position and orientation of the robot; and calculating an actual torque of the one motor based on current feedback information of the one motor, wherein a load parameter corresponding to a theoretical torque closest to the actual torque among the plurality of theoretical torques is selected.

According to a tenth aspect of the present invention, the load parameter setting method according to the ninth aspect further includes a step of setting one calculation method of a plurality of calculation methods for calculating the theoretical torques.

These objects, features, and advantages, as well as other objects, features, and advantages, of the present invention will become more clearly from a detailed description of exemplary embodiments of the present invention illustrated in the accompanying drawings.

BRIEF DESCRIPTION OF THE DRAWINGS

FIG. 2 is a view illustrating load parameters stored in a storage unit.

FIG. 4 is a view illustrating part of an operating program.

FIG. 5 is a view illustrating part of another operating program.

DETAILED DESCRIPTION

Figure 1:
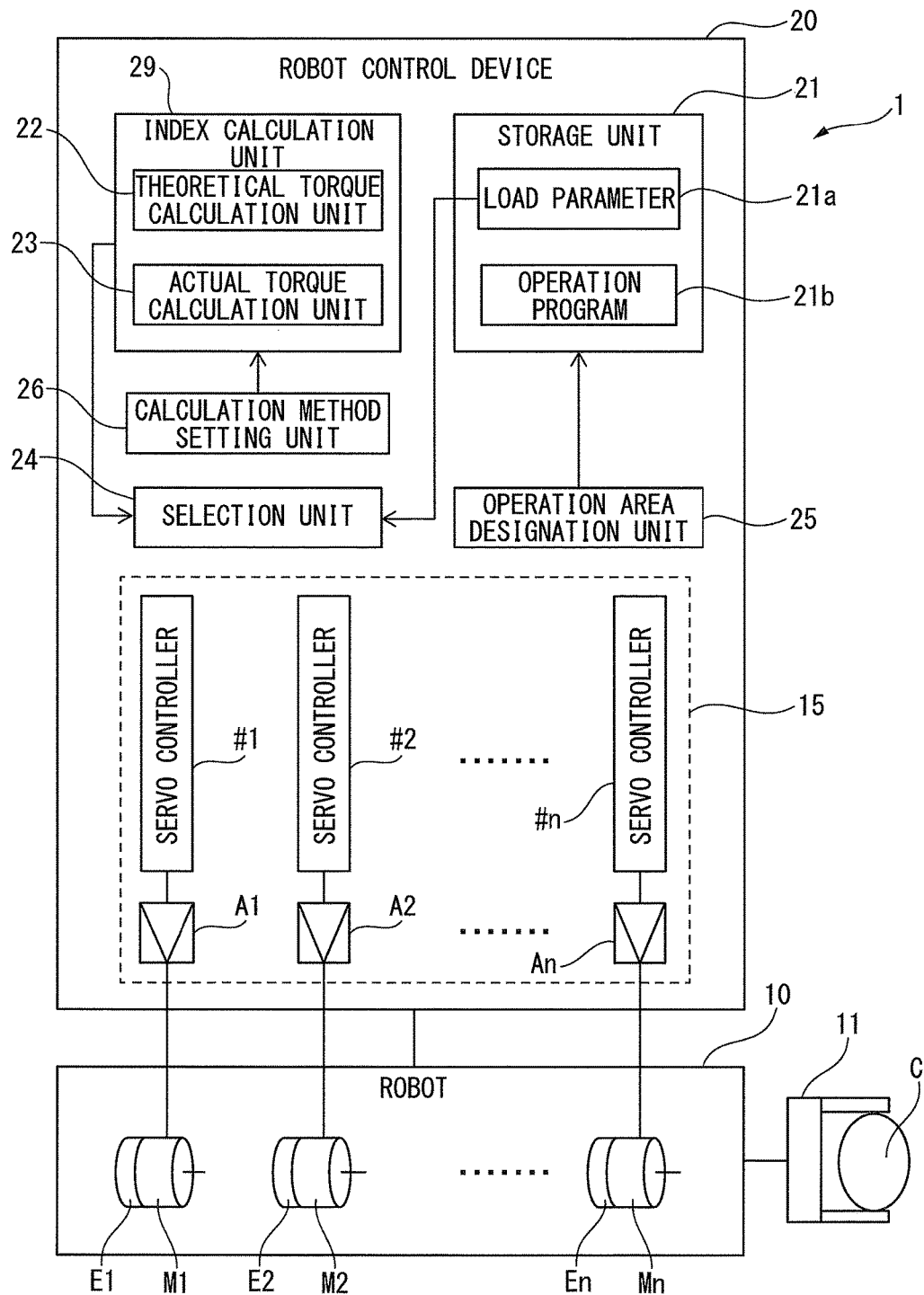
FIG. 1 is a schematic view of a system including a parameter selection device based on the present invention.

With reference to the accompanying drawings, embodiments of the present invention will be described hereinbelow. In the drawings, like members are denoted by like reference numerals. In order to facilitate understanding, the scale of the drawings has been changed arbitrarily.

FIG. 1 is a schematic view of a system including a parameter selection device based on the present invention. The system 1 illustrated in FIG. 1 mainly includes a robot 10, and a robot control device 20 that controls the robot 10.

The robot 10 is an articulated robot and includes a plurality of motion axes driven by a plurality of servo motors M1-Mn. The plurality of servo motors M1-Mn have encoders E1-En attached thereto that detect the positions of the servo motors M1-Mn, respectively. Further, on a distal end of the robot 10, there is provided a hand 11 for gripping a workpiece C.

The robot control device 20 is a digital computer and includes a servo control unit 15 configured of servo controllers #1-#n for the respective motion axes. The servo controllers #1-#n receive a movement command of the robot 10, and outputs a torque command to servo amplifiers A1-An along with a feedback signal received from the encoders E1-En associated with the respective motion axes of the robot 10. The servo amplifiers A1-An supply an electric current to the servo motors M1-Mn of the respective motion axes to drive the servo motors M1-Mn based on each torque command. In this manner, the hand 11 of the robot 10 is located at a desired position.

Further, the robot control device 20 also serves as a load parameter setting device that sets a load parameter of the workpiece C gripped by the robot 10. As illustrated in FIG. 1, the robot control device 20 includes a storage unit 21 that stores a plurality of load parameters 21a corresponding respectively to a plurality of types of workpieces to be gripped by the robot 10. Further, let it be assumed that the storage unit 21 also stores an operation program 21b of the robot 10.

FIG. 2 is a view illustrating a load parameter stored in the storage unit. As illustrated in FIG. 2, the load parameter composed of at least one of weight W, location of center of gravity B, inertia I, and size S of the workpiece C. These load parameters are experimentally obtained beforehand for each type of workpiece C (C1, C2, C3, . . . , Cn), and stored in the storage unit 21 in the form of a table.

Referring again to FIG. 1, the robot control device 20 includes an index calculation unit 29 that calculates, for each of the plurality of load parameters stored in the storage unit 21, an index for selecting the load parameter of the workpiece gripped by the robot 10 based on a current position and orientation of the robot 10.

As can be seen from FIG. 1, the index calculation unit 29 includes a theoretical torque calculation unit 22 that calculates, for each of the plurality of load parameters 21a, a plurality of theoretical torques outputted from one of the plurality of servo motors M1-Mn based on the current position and orientation of the robot 10, and an actual torque calculation unit 23 that calculates an actual torque of the one motor based on current feedback information of the above-described one motor. The currents supplied from the servo amplifiers A1-An to the servo motors M1-Mn may be used as the current feedback information.

Further, the robot control device 20 includes a selection unit 24 that selects the load parameter of the workpiece from the plurality of load parameters stored in the storage unit 21 based on the index calculated by the index calculation unit 29. The selection unit 24 may select a load parameter corresponding to the theoretical toque, which is the closest to the actual torque calculated by the actual torque calculation unit 23, of the plurality of theoretical torques calculated by the theoretical torque calculation unit 22.

Further, the robot control device 20 includes an operation area designation unit 25 that designates an operation area of the robot 10 that selects a load parameter, and a calculation method setting unit 26 that sets one calculation method of a plurality of calculation methods included in the theoretical torque calculation unit 22 for calculating theoretical torques.

Figure 3:
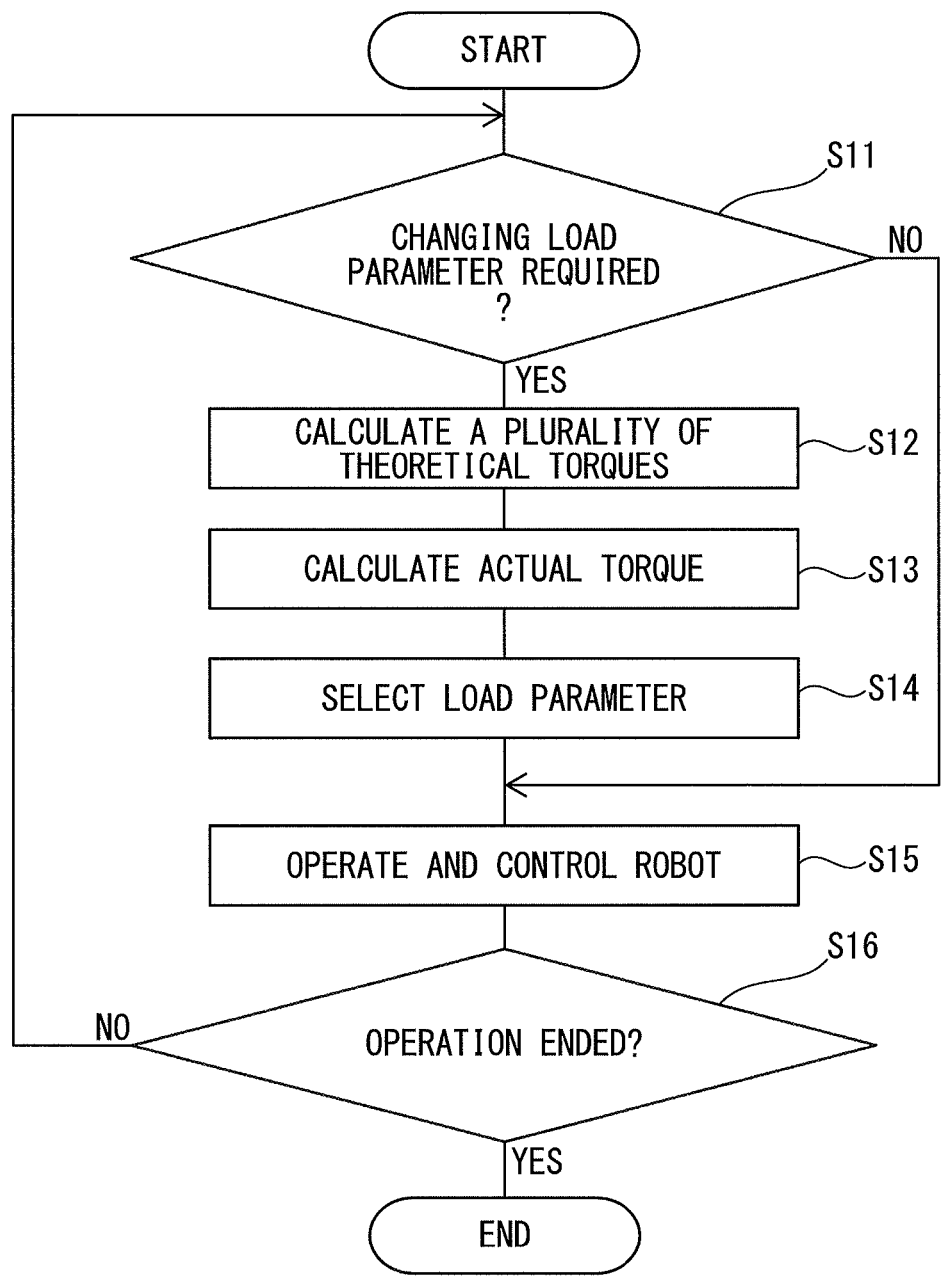
FIG. 3 is a view illustrating a first flow chart of the parameter selection device based on the present invention.

FIG. 3 is a view illustrating a first flow chart of the parameter selection device based on the present invention. Let it be assumed that the content illustrated in FIG. 3 is repetitively executed for each predetermined control cycle when the robot 10 is operated based on the operation program 21b stored in the storage unit 21. Meanwhile, let it be assumed that when the content illustrated in FIG. 3 is executed, the hand 11 of the robot 10 grips an arbitrary workpiece.

First, at step S11, it is determined whether it is necessary to change the load parameter. When it is not necessary to change the load parameter, the process proceeds to step S15 and causes the robot 10 to continue operation. When it is necessary to change the load parameter, the process proceeds to step S12.

In this regard, FIG. 4 is a view illustrating part of the operation program. In the operation program 21b of FIG. 4, "automatic load parameter selection instruction" is described at two positions. Therefore, it is determined that it is required to change the load parameter when the content of the operation program 21b proceeds to a row indicating the "automatic load parameter selection instruction".

Referring again to FIG. 3, at step S12, the theoretical torque calculation unit 22 of the index calculation unit 29 grasps a current position and orientation of the robot 10 from the encoders E1-En provided at the motors M1-Mn of the respective operation axes of the robot 10. The theoretical torque calculation unit 22 calculates, as theoretical indices, a plurality of theoretical torques outputted from one motor of the motors M1-Mn based on the current position and orientation of the robot 10 for each of the load parameters stored in the storage unit 21.

The above-described one motor is a motor that drives a motion axis of the robot 10 which has a large variation in the torque corresponding to the load parameter. When the robot 10 is in a stationary state, the above-described one motor is the motor M2 that drives the motion axis to which the torque due to gravity is most applied, e.g., the motion axis corresponding to the shoulder portion of the robot 10.

Subsequently, at step S13, the actual torque calculation unit 23 of the index calculation unit 29 calculates, as the actual index, the actual torque of the one motor Mn based on the current feedback information of the one motor Mn. Subsequently, at step S14, the selection unit 24 compares the plurality of theoretical torques calculated by the theoretical torque calculation unit 22 with the actual torque calculated by the actual torque calculation unit 23. Further, the selection unit 24 selects the load parameter corresponding to a theoretical torque, which is the closest to the actual torque, of the plurality of theoretical torques, and sets the load parameter with respect to the robot 10.

Subsequently, at step S15, the robot 10 is operated using the selected load parameter. Further, at step S16, when it is determined that the content of the operation program 21b is finished, the process is ended.

In the present invention, the theoretical torque is calculated using the load parameters stored in the storage unit. Thus, there is no need to use a complex calculation formula in order to calculate the theoretical torque. The theoretical torque closest to the actual torque is determined from among the plurality of theoretical torques calculated by a simple calculation, and the load parameter corresponding to the theoretical torque is merely selected. As such, in the present invention, it is possible to automatically select the load parameter corresponding to the workpiece gripped by the robot 10, without performing a complex calculation.

Further, since one load parameter of the plurality of load parameters stored beforehand is merely selected, it is not necessary for the operator to designate the workpiece to be gripped by the robot 10, and there is no possibility that the operator erroneously sets the load parameter. Moreover, in the present invention, no special hardware is additionally used to select the load parameter, so that the load parameter setting device 20 can be configured at low cost.

In the above-described embodiment, the selection unit 24 selects a load parameter corresponding to the theoretical torque closest to the actual torque. In an unillustrated embodiment, a load parameter may be selected which corresponds to the theoretical torque larger than and closest to the actual torque.

Further, a theoretical force calculation unit that calculates a theoretical force acting on the robot 10 and an actual force calculation unit that calculates an actual force acting on the robot 10 may be provided in place of the theoretical torque calculation unit 22 and the actual torque calculation unit 23 in the above-described embodiment.

In this instance, the theoretical force calculation unit calculates, as a theoretical index, a theoretical force for each load parameter based on a current position and orientation, speed, acceleration or the like of the robot 10. Further, the actual force calculation unit is a force sensor provided on the robot base of the robot 10, for example, and outputs an actual force as the actual index. Similarly to what has been described above, the selection unit 24 selects a load parameter corresponding to the theoretical force, which is closest to the actual force, of the plurality of theoretical forces calculated for each of the load parameters. Also in such an instance, it will be apparent that an effect similar to that described above is obtained. The force sensor suffices to have accuracy capable of selecting a load parameter. In other words, the accuracy of the force sensor in this instance may not be so high.

The operation area of the robot 10 for which the load parameter is selected may be designated beforehand using the operation area designation unit 25 illustrated in FIG. 1. FIG. 5 is a view illustrating part of another operation program. The operation program illustrated in FIG. 5 includes operation instructions to position 1, position 2, position 3, and position 4. Let it be assumed that designation is made beforehand by the operation area designation unit 25 such that load parameters are selected with respect to a predetermined range including the position 2 and a predetermined range including the position 4, for example.

When the robot 10 is operated based on the operation program illustrated in FIG. 5, the selection of the load parameters such as described above is automatically performed when the robot 10 is moved to the predetermined range including the position 2 and the predetermined range including the position 4. In such an instance, a situation can be avoided in which the operator forgets to change over the load parameters. Alternatively, it may be configured such that the above-described selection of load parameters is performed when the robot 10 moved out of the predetermined range including the position 2 or the position 4.

Figure 6:
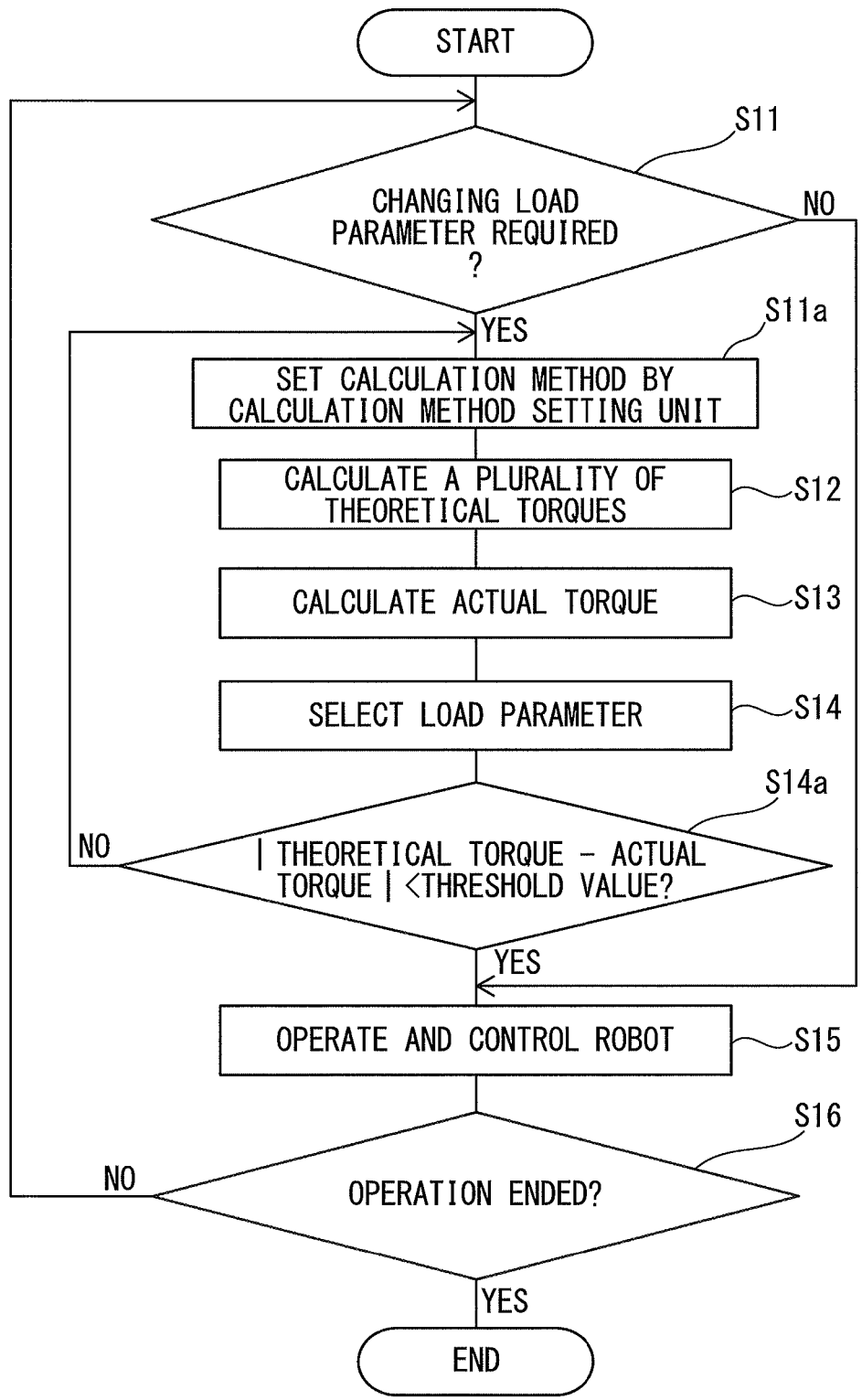
FIG. 6 is a view illustrating a second flow chart of the parameter selection device based on the present invention.

FIG. 6 is a view illustrating a second flow chart of the parameter selection device based on the present invention. Let it be assumed that the content illustrated in FIG. 6 is repetitively performed for each predetermined control cycle based on the operation program 21b stored in the storage unit 21 when the robot 10 is operated. Description of the steps same as those described by reference to FIG. 3 is omitted in order to avoid overlapping. Let it be assumed that the hand 11 of the robot 10 grips an arbitrary workpiece when the content illustrated in FIG. 6 is performed.

As illustrated in FIG. 6, at step S11a between step S11 and step S12, the calculation method setting unit 26 sets one calculation method of the plurality of calculation methods for calculating theoretical torques. In the present invention, let it be assumed that the theoretical torque calculation unit 22 has first calculation method to third calculation method.

The first calculation method is a method for selecting a load parameter corresponding to the theoretical torque closest to the actual torque among the plurality of theoretical torques as reference is made to FIG. 3, for example. This method is advantageous when the robot 10 remains stationary.

The second calculation method is as follows: In a predetermined time zone or a predetermined section for continuing operation of the robot 10, a set of a plurality of theoretical torques and single actual torque to be outputted by a motor, e.g., the motor M2 of the robot 10 is calculated for each predetermined control cycle as described above and sequentially stored as a plurality of sets in the storage unit 21. Further, an absolute value for the deviation between each of the plurality of theoretical torques and the single actual torque is sought for each of the stored plurality of sets as described above. Then, an average value and a dispersion of the absolute values for the deviations are sought, and a set which includes a smallest average value or a smallest dispersion is determined. The load parameter corresponding the theoretical torque closest to the actual torque among the plurality of theoretical torques in the determined set is selected.

It is not preferable to apply the theoretical torques and the actual torques calculated when the robot 10 remains stationary, which is actually being operated, since such torques do not have the appropriate accuracy. Further, if the theoretical torques and the actual torque are calculated when the robot 10 is operating with a speed and/or an acceleration, there is a case in which these torques include an instantaneous error. In this regard, the above-described second calculation method is not influenced by the instantaneous error since it uses the average value and the dispersion. Thus, the second calculation method is particularly advantageous when the robot 10 is moved at a velocity and/or is accelerated.

In the above-described first calculation method, the robot 10 is not allowed to operate when estimating the load parameter. Further, in the above-described second calculation method, the robot 10 is allowed to operate but not specially to estimate the load parameter. As such, when load parameters for two types of workpieces which are substantially equal in weight but different in inertia are stored in the storage unit 21, there is a possibility that the appropriate load parameter may not be selected from among these load parameters.

Thus, in the third calculation method, the robot 10 is operated specially to estimate load parameters. Such special operation is a predetermined operation in which speed and acceleration are imparted to each motion axis of the robot 10. In the third calculation method, the robot 10 is caused to perform the above-described special operation, which results in the theoretical torques and the actual torque to be outputted by the motor M2 of the robot becoming sufficiently different depending on the difference in inertia. Similarly to what has been described above, selection of load parameters is performed using these torques.

Let it be assumed that the first calculation method, for example, is set at step S11a of FIG. 6. At step S12, the theoretical torque is calculated based on the first calculation method. Thereafter, the actual torque is calculated (step S13), and the load parameter is selected (step S14) as described above. Subsequently, at step S14a, the absolute value of the deviation between the theoretical torque and the actual torque is calculated. The theoretical torque used at step S14a is the theoretical torque closest to the actual torque.

It is determined whether the absolute value of the deviation between the theoretical torque and the actual torque is smaller than a predetermined threshold value. Let it be assumed that the predetermined threshold value is obtained by experiment or the like. When the absolute value of the deviation is smaller than the predetermined threshold value, it can be determined that the theoretical torque is relatively close to the actual torque and thus that the first calculation method, by which the theoretical torque is calculated, is appropriate. In such an instance, the robot 10 is operated using the selected load parameter (step S15), and in a given instance, the operation is ended (step S16).

In contrast, when the absolute value of the deviation is not smaller than the predetermined threshold value, the theoretical torque and the actual torque are relatively deviated from each other, and there is a high possibility that the first calculation method by which the theoretical torque is calculated, is inappropriate. In such an instance, the process returns to step S11a. The calculation method setting unit 26 sets another calculation method, e.g., the second calculation method among the plurality of calculation methods.

At step S12, the theoretical torque is calculated based on the second calculation method. Thereafter, the actual torque is calculated (step S13), and the load parameter is selected (step S14) as described above. Subsequently, at step S14a, the absolute value of the deviation between the theoretical torque and the actual torque is calculated as described above. When it is determined that the absolute value of the deviation between the theoretical torque and the actual torque is not smaller than the predetermined threshold value, the process returns to step S11a, and the calculation method setting unit 26 sets the third calculation method and repeats a similar process. As a matter of course, another calculation method may be prepared.

In the embodiment described by reference to FIG. 6, when the result of calculation by one calculation method is unsatisfactory, another calculation method is adopted. Let it be assumed that the process is repeated until the absolute value of the deviation becomes smaller than the predetermined threshold value. Thus, in the embodiment illustrated in FIG. 6, it is understood that the robot 10 is accurately operated based the appropriate load parameter.

Further, in an unillustrated embodiment, a method in which the time required for calculation processing is shortest or a method in which it is not necessary to cause the robot 10 to be operated specially to estimate the load parameter may be the first calculation method. A method in which a longer time is taken for calculation processing than in the first calculation method or a method in which it is necessary to cause the robot 10 to be operated specially to estimate the load parameter may be adopted as the second calculation method. In the unillustrated embodiment, it is understood that when the robot 10 is operated based on the load parameter selected via the first calculation method, it is possible to reduce the time required for calculation processing or load parameter setting.

Advantage of the Invention

In the first and sixth aspects of the present invention, a load parameter suitable for a workpiece is selected from among a plurality of load parameters based on an index calculated by the index calculation unit, thereby setting the load parameter. Thus, the load parameter associated with the workpiece gripped by the robot can be automatically selected without performing a complex calculation. Further, since one load parameter is merely selected from among the plurality of load parameters which are stored beforehand, there is no need for the operator to designate the workpiece to be gripped by the robot, and also there is no possibility for the operator to set the load parameter erroneously.

In the second and seventh aspects of the present invention, the load parameter can be automatically selected when the robot enters a predetermined operation area. Thus, a situation can be avoided in which the operator forgets to switch the load parameters.

In the third and eighth aspects of the present invention, it is described in the operation program of the robot to select the load parameters. Thus, it is possible for the operator to explicitly designate the timing when the load parameter is to be switched.

In the fourth and ninth aspects of the present invention, the load parameter is set by selecting a load parameter corresponding to the theoretical torque closest to the actual torque from among the plurality of theoretical torques calculated by a simple calculation. Thus, it is possible to easily select the load parameter without performing a complex calculation.

In the fifth and tenth aspects of the present invention, when the result of calculation by one calculation method is unsatisfactory, another calculation method can be adopted.

While the present invention has been described using exemplary embodiments thereof, it will be understood by those skilled in the art that the foregoing changes as well as various other changes, omissions, and additions are possible without departing from the scope of the present invention.

What is claimed is:

1. A load parameter setting device for setting a load parameter of a workpiece gripped by a robot including a plurality of motors that drive a plurality of motion axes respectively, the load parameter setting device comprising:
   a storage unit that stores a plurality of load parameters corresponding to a plurality of types of workpieces to be gripped by the robot respectively;
   an index calculation unit that:
      produces a plurality of theoretical torques by calculating, for each of the plurality of load parameters stored in the storage unit, a theoretical torque output by at least one of the robot motors based on a current position and a current orientation of the robot detected by motor position sensors;

calculates an actual torque output by the at least one of the robot motors based on feedback information including electrical currents supplied to the robot motors by motor power circuitry; and a selection unit that:

compares the theoretical torque for each load parameter to the actual torque, and selects one of the load parameters of the workpiece from among the plurality of load parameters stored in the storage unit, the one of the load parameters is selected based on the theoretical torque among the plurality of theoretical torques indicated by the comparison to be closest to the actual torque.

2. The load parameter setting device according to claim 1, further comprising: an operation area designation unit that designates an operation area of the robot for selecting the one of the load parameters.

3. The load parameter setting device according to claim 1, wherein an operation program of the robot includes an instruction for selecting the one of the load parameters.

4. The load parameter setting device according to claim 1, wherein the index calculation unit has a plurality of calculation methods for calculating the plurality of theoretical torques, the load parameter setting device further comprising:

a calculation method setting unit that sets one calculation method of the plurality of calculation methods.

5. A load parameter setting method for setting a load parameter of a workpiece gripped by a robot including a plurality of motors that drive a plurality of motion axes respectively, comprising steps of:

storing a plurality of load parameters corresponding to a plurality of types of workpieces to be gripped by the robot respectively;

produces a plurality of theoretical torques by calculating, for each of the plurality of stored load parameters, a theoretical torque output by at least one of the robot motors based on a current position and orientation of the robot detected by motor position sensors;

calculating an actual torque output by the at least one of the robot motors based on feedback information including electrical currents supplied to the robot motors by motor power circuitry;

comparing the theoretical torque for each load parameter to the actual torque; and selecting one of the load parameters of the workpiece from among the plurality of stored load parameters, based on the theoretical torque among the plurality of theoretical torques indicated by the comparison to be closest to the actual torque.

6. The load parameter setting method according to claim 5, further comprising a step of: designating an operation area of the robot for selecting the one of the load parameters.

7. The load parameter setting method according to claim 5, wherein an operation program of the robot includes an instruction for selecting the one of the load parameters.

8. The load parameter setting method according to claim 5, further comprising a step of: setting one calculation method of a plurality of calculation methods for calculating the plurality of theoretical torques.

* * * * *